(12) United States Patent
Mai et al.

(10) Patent No.: US 11,941,023 B2
(45) Date of Patent: Mar. 26, 2024

(54) SYSTEM AND METHOD FOR IMPLEMENTING INCREMENTAL DATA COMPARISON

(71) Applicant: ZTE CORPORATION, Guangdong (CN)

(72) Inventors: Jianhua Mai, Guangdong (CN); Zhiwen Liu, Guangdong (CN); Yan Ding, Guangdong (CN); Longbo Guo, Guangdong (CN); Peng Zhang, Guangdong (CN); Zhenhua Xu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 17/622,796

(22) PCT Filed: May 22, 2020

(86) PCT No.: PCT/CN2020/091716
§ 371 (c)(1),
(2) Date: Dec. 24, 2021

(87) PCT Pub. No.: WO2020/259149
PCT Pub. Date: Dec. 30, 2020

(65) Prior Publication Data
US 2022/0245169 A1    Aug. 4, 2022

(30) Foreign Application Priority Data

Jun. 26, 2019 (CN) .......................... 201910561602.7

(51) Int. Cl.
*G06F 16/30* (2019.01)
*G06F 16/27* (2019.01)

(52) U.S. Cl.
CPC .................................. *G06F 16/27* (2019.01)

(58) Field of Classification Search
CPC ...................................................... G06F 16/27
See application file for complete search history.

(56) References Cited

U.S. PATENT DOCUMENTS

| 7,702,698 B1 | 4/2010 | Chakravarthy |
| 2008/0091669 A1 | 4/2008 | Anderson et al. |

(Continued)

FOREIGN PATENT DOCUMENTS

| CN | 103810247 A | 5/2014 |
| CN | 106057008 A | 10/2016 |

(Continued)

OTHER PUBLICATIONS

ZTE Corporation, Extended European Search Report, EP20832003.6, dated Jul. 11, 2022, 13 pgs.

(Continued)

*Primary Examiner* — Khanh B Pham
(74) *Attorney, Agent, or Firm* — Li & Cai Intellectual Property (USA) Office

(57) ABSTRACT

Provided are a system and method for implementing an incremental data comparison. The system includes: a synchronization T environment, a simulation F environment, a simulation tool, a memory database, a comparison tool and a result database. The T environment includes a synchronization environment core application, a traditional commercial database, an incremental synchronization tool and a synchronization environment distributed database. The F environment includes a simulation environment core application and a simulation environment distributed database. The simulation tool is configured to play back a T environment service and an F environment service. The memory database is configured to store a mapping relationship between message values of the T and F environment. The comparison tool is configured to compare data in the T and F environment according to the mapping relationship (Continued)

between the message values. The result database is configured to store comparison result data generated by the comparison tool.

10 Claims, 4 Drawing Sheets

(56) References Cited

U.S. PATENT DOCUMENTS

| | | | |
|---|---|---|---|
| 2018/0081956 A1* | 3/2018 | Xu | G06F 16/275 |
| 2018/0275961 A1* | 9/2018 | Raskar | G06F 7/38 |
| 2018/0322427 A1 | 11/2018 | Dai et al. | |
| 2020/0364131 A1* | 11/2020 | Bryant | G06F 11/3457 |

FOREIGN PATENT DOCUMENTS

| | | |
|---|---|---|
| CN | 106339500 A | 1/2017 |
| CN | 106817415 A | 6/2017 |
| CN | 104731814 B | 12/2017 |
| CN | 108228740 A | 6/2018 |
| CN | 108241676 A | 7/2018 |
| CN | 108536521 A | 9/2018 |
| CN | 108733662 A | 11/2018 |
| CN | 108804464 A | 11/2018 |
| CN | 109033127 A | 12/2018 |
| CN | 105589961 B | 2/2019 |
| JP | 6187351 A | 7/1994 |
| JP | 2009516273 A | 4/2009 |
| JP | 2009266243 A | 11/2009 |
| JP | 2010160613 A | 7/2010 |

OTHER PUBLICATIONS

ZTE Corporation, International Search Report with English Translation, PCT/CN2020/091716, dated Aug. 5, 2020, 5 pgs.
Japan Patent Office, First Office Action dated Feb. 14, 2023 for application No. JP2021-576799.
Korean Patent Office, First Office Action dated Jan. 25, 2024 for application No. KR10-2021-7042766.
Internet document—"Innodb redo log, binary log (binlog) and recovery", [Jan. 24, 2024. search], and the internet source: https://mblog. naver. com. / PostView naver(Jan. 24, 2017).

* cited by examiner

SYSTEM AND METHOD FOR IMPLEMENTING INCREMENTAL DATA COMPARISON

CROSS REFERENCE TO RELATED APPLICATIONS

The present application is a United States National Stage Application filed under 35 U.S.C. § 371 of PCT Patent Application Serial No. PCT/CN2020/091716, filed May 22, 2020, which claims the priority to Chinese patent application No. 201910561602.7 filed before the China Intellectual Property Administration on Jun. 26, 2019, each of which is incorporated by reference herein in its entirety.

TECHNICAL FIELD

Embodiments of the present disclosure relate to, but are not limited to, the distributed database field, and more particularly, to a system and a method for implementing an incremental data comparison.

BACKGROUND

For a long time, the financial database market has been monopolized by traditional relational databases such as Oracle, IBM DB2 and Microsoft SQL Server. After decades of development and iteration, the traditional relational databases have been unable to meet the needs of the development of new financial technology. Therefore, replacing the traditional architecture with a new distributed database has become a hot topic in the financial database market.

How to ensure the consistency of service processes and service data before and after replacement is an important issue for completing database transformation. In terms of data comparison technology in the database field, the existing technology in the industry mainly focuses on the consistency comparison of a small amount of data or data at a source and destination of a stand-alone database, which is unable to meet the requirements of data comparison between a traditional commercial database and the new distributed database.

SUMMARY

In view of this, some embodiments of the present disclosure provide a system for implementing an incremental data comparison, including:
a synchronization T environment, a simulation F environment, a simulation tool, a memory database, a comparison tool and a result database; where
the T environment includes a synchronization environment core application, a traditional commercial database, an incremental synchronization tool and a synchronization environment distributed database;
the F environment includes a simulation environment core application and a simulation environment distributed database;
the simulation tool is configured to play back a T environment service and an F environment service;
the memory database is configured to store a mapping relationship between message values of the T environment and the F environment;
the comparison tool is configured to compare data in the T environment and the F environment according to the mapping relationship between the message values; and
the result database is configured to store comparison result data generated by the comparison tool.

Some embodiments of the present disclosure further provide a method for implementing an incremental data comparison, including:
playing back, by a simulation tool, a T environment service and an F environment service, and storing a mapping relationship between message values of a T environment and an F environment in a memory database; and
comparing, by a comparison tool, data in the T environment and the F environment according to the mapping relationship between the message values and storing comparison result data in a result database.

The technical solutions provided by the embodiments of the present disclosure can handle the comparison of large data volumes in distributed databases.

Other features and advantages of the present disclosure will be described in the following description, and partly become obvious from the description, or understood by implementing the present disclosure. The purpose and other advantages of the present disclosure may be realized and obtained through a structure specifically pointed out in the description, claims and drawings.

BRIEF DESCRIPTION OF THE DRAWINGS

The accompanying drawings are used to provide a further understanding of the technical scheme of the present disclosure, and constitute a part of the description. Together with the embodiments of the present disclosure, they are used to explain the technical scheme of the present disclosure, and do not constitute a limitation to the technical scheme of the present disclosure.

DETAILED DESCRIPTION

The embodiments of the present disclosure may be described in detail below with reference to the accompanying drawings in order to make the objectives, technical solutions and advantages of the present disclosure clearer. It should be noted that the embodiments in the present disclosure and the features in the embodiments may be combined with each other to derive other embodiments, in the case of no conflict.

The steps shown in the flowcharts of the accompanying drawings may be executed in a computer system, including such as a set of computer-executable instructions. Although a logical order is shown in the flowcharts, in some cases, the steps shown or described may be executed in a different order than here.

Figure 1:
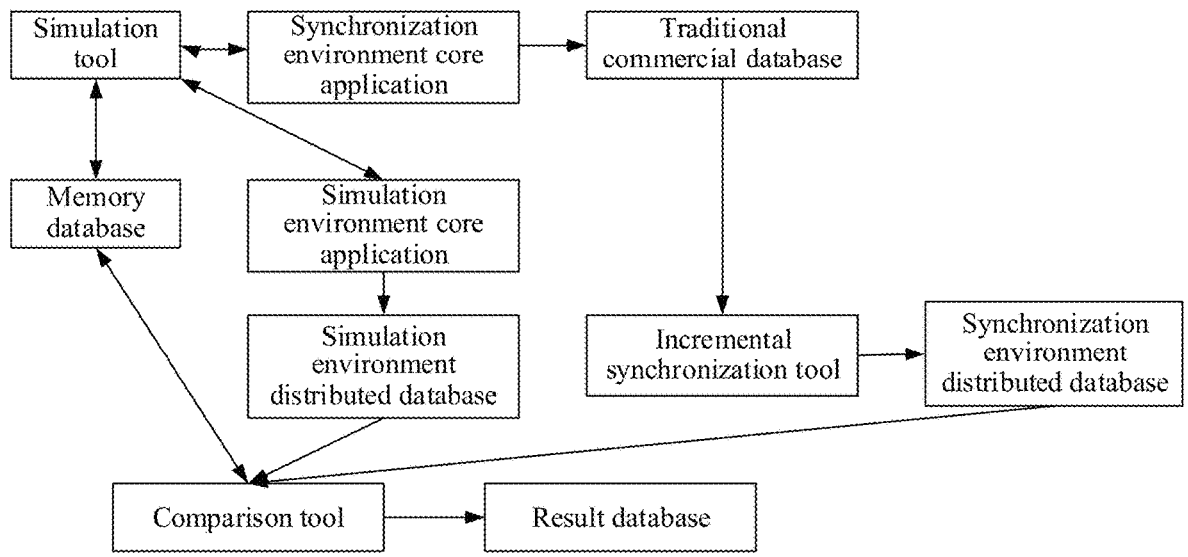
FIG. 1 is a schematic structural diagram of a system for implementing an incremental data comparison according to an embodiment of the present disclosure.

FIG. 1 is a schematic structural diagram of a system for implementing an incremental data comparison according to an embodiment of the present disclosure. As shown in FIG. 1, the system includes:

a synchronization environment (hereinafter "T environment"), a simulation environment (hereinafter "F environment"), a simulation tool, a memory database, a comparison tool and a result database; where the T environment includes a synchronization environment core application, a traditional commercial database, an incremental synchronization tool and a synchronization environment distributed database;

the F environment includes a simulation environment core application and a simulation environment distributed database;

the simulation tool is configured to play back a T environment service and an F environment service;

the memory database is configured to store a mapping relationship between message values of the T environment and the F environment;

the comparison tool is configured to compare data in the T environment and the F environment according to the mapping relationship between the message values; and the result database is configured to store comparison result data generated by the comparison tool.

In an embodiment, the simulation environment core application is configured to write service data input by the simulation tool into the simulation environment distributed database, generate a corresponding binary log (binlog), and return a result message to the simulation tool;

the synchronization environment core application is configured to write the service data input by the simulation tool into the traditional commercial database, generate corresponding redo log, and return a result message to the simulation tool;

the incremental synchronization tool is configured to collect the redo log of the traditional commercial database, parse the redo log into a plurality of structured query language (SQL) statements, then write the plurality of SQL statements into the synchronization environment distributed database to generate a corresponding binlog; and the simulation tool is specifically configured to parse result messages returned by the T environment and the F environment, obtain the mapping relationship between message values, and then write the mapping relationship between the message values into the memory database.

In an embodiment, the comparison tool includes a compare server (CS) and a plurality of compare clients (CC), each of the plurality of CCs is configured to actively initiate a heartbeat registration to the CS, the CS is configured to assign a pair of comparison sources to each of the plurality of CCs, and issue binlog starting position information of the T environment and the F environment to all the CCs simultaneously;

each of the plurality of CCs is further configured to access a corresponding comparison source in a simulated standby mode; and the pair of comparison sources are respectively a sharding corresponding to the T environment and a sharding corresponding to the F environment.

Herein, the CS is further configured to request a field value globally incremented in service from each of the plurality of CCs;

each of the plurality of CCs is further configured to search from a binlog starting position in the F environment until a first binlog position not less than the field value is found, and return a field value corresponding to the first binlog position to the CS;

the CS is further configured to take a maximum field value as an initial field value after collecting the field value returned by each of the plurality of CCs, query the memory database to obtain a corresponding initial field value of the T environment corresponding to the initial field value according to the mapping relationship between the message values of the T environment and the F environment, and issue the initial field values of the T environment and the F environment to all the CCs;

each of the plurality of CCs is further configured to obtain a binlog file and position corresponding to the initial field values of the T environment and the F environment, and return the binlog file and position to the CS;

the CS, after receiving the binlog file and position, notifies all the CCs to start parsing the binlog by batch;

each of the plurality of CCs is further configured to parse the binlog by batch, replace a value that has a correspondence between the F environment and the T environment with a value of the T environment, and return a parsing result; and the CS generates a generation file and performs a comparison after receiving a parsing result of a batch, and stores a comparison result in the result database.

In an embodiment, performing the comparison includes:

comparing and recording a change history in the generation file by using a hash algorithm with a "table name+primary key" as a key;

filtering hot spot data during the comparison, observing a matching principle of no crossing and maximum matching, and using a forward or backward matching as a matching method, where the forward matching retains a difference and the backward matching confirms the difference; and recording a record that still does not confirm a matching or confirm the difference beyond a specified number of batches as an expired record, outputting the expired record as the difference, retaining a record that fails to match before an expiration period to perform a comparison in a next batch.

Figure 2:
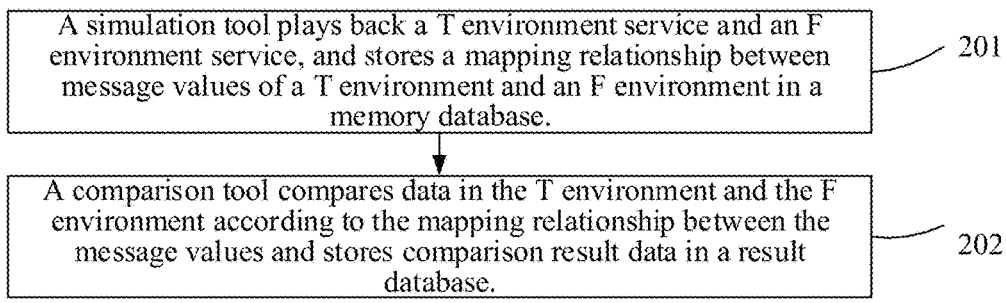
FIG. 2 is a schematic flow chart of a method for implementing an incremental data comparison according to an embodiment of the present disclosure.

FIG. 2 is a schematic flow chart of a method for implementing an incremental data comparison according to an embodiment of the present disclosure. As shown in FIG. 2, the method includes the following steps.

In step 201, a simulation tool plays back a T environment service and an F environment service, and stores a mapping relationship between message values of a T environment and an F environment in a memory database.

In step 202, a comparison tool compares data in the T environment and the F environment according to the mapping relationship between the message values and stores comparison result data in a result database.

In an embodiment, the T environment includes a synchronization environment core application, a traditional commercial database, an incremental synchronization tool and a synchronization environment distributed database. The F environment includes a simulation environment core application and a simulation environment distributed database.

The step of the simulation tool playing back the T environment service and the F environment service includes:

the simulation environment core application writing service data input by the simulation tool into the simulation environment distributed database in the F environment, generating a corresponding binlog, and returning a result message to the simulation tool;

the synchronization environment core application writing the service data input by the simulation tool into the traditional commercial database, generating a corresponding redo log, and returning a result message to the simulation tool;

the incremental synchronization tool collecting the redo log of the traditional commercial database, parsing the redo log into a plurality of structured query language (SQL) statements, then writing the plurality of SQL statements into the synchronization environment distributed database to generate a corresponding binlog; and the simulation tool parsing result messages returned by the T environment and the F environment, obtaining the mapping relationship between the message values, and then writing the mapping relationship between the message values into the memory database.

In an embodiment, the comparison tool includes a comparison server (CS) and a plurality of comparison clients (CC).

Before the comparison tool compares the data in the T environment and the F environment, the method further includes:

each of the plurality of CCs actively initiating a heartbeat registration to the CS;

the CS assigning a pair of comparison sources to each of the plurality of CCs, and issuing binlog starting position information of the T environment and the F environment to all the CCs simultaneously;

each of the plurality of CCs accessing a corresponding comparison source in a simulated standby mode; and the pair of comparison sources being respectively a sharding corresponding to the T environment and a sharding corresponding to the F environment.

In an embodiment, the step of the comparison tool compares the data in the T environment and the F environment according to the mapping relationship between the message values, includes:

the CS requesting a field value globally incremented in service from each of the plurality of CCs;

each of the plurality of CCs searching from a binlog starting position in the F environment until a first binlog position not less than the field value is found, and returning a field value corresponding to the first binlog position to the CS;

the CS taking a maximum field value as an initial field value after collecting the field value returned by each of the plurality of CCs, querying the memory database to obtain a corresponding initial field value of the T environment corresponding to the initial field value according to the mapping relationship between the message values of the T environment and the F environment, and issuing the initial field values of the T environment and the F environment to all the CCs;

each of the plurality of CCs obtaining a binlog file and position corresponding to the initial field values in the T environment and the F environment, and returning the binlog file and position to the CS;

the CS notifying all the CCs to start parsing the binlog by batch after receiving the binlog file and position;

each of the plurality of CCs parsing the binlog by batch, replacing a value that has a correspondence between the F environment and the T environment with a value of the T environment, and returning a parsing result; and the CS generating a generation file and performing a comparison after receiving a parsing result of a batch, and storing a comparison result in the result database.

In an embodiment, performing the comparison includes:

comparing and recording a difference in the generation file by using a hash algorithm with a "table name+ primary key" as a key;

filtering hot spot data during the comparison, observing a matching principle of no crossing and maximum matching, and using a forward or backward matching as a matching method, where the forward matching retains a difference and the backward matching confirms the difference; and recording a record that still does not confirm a matching or confirm the difference beyond a specified number of batches as an expired record, outputting the expired record as the difference, retaining a record that fails to match before an expiration period to perform a comparison in a next batch.

Figure 3:
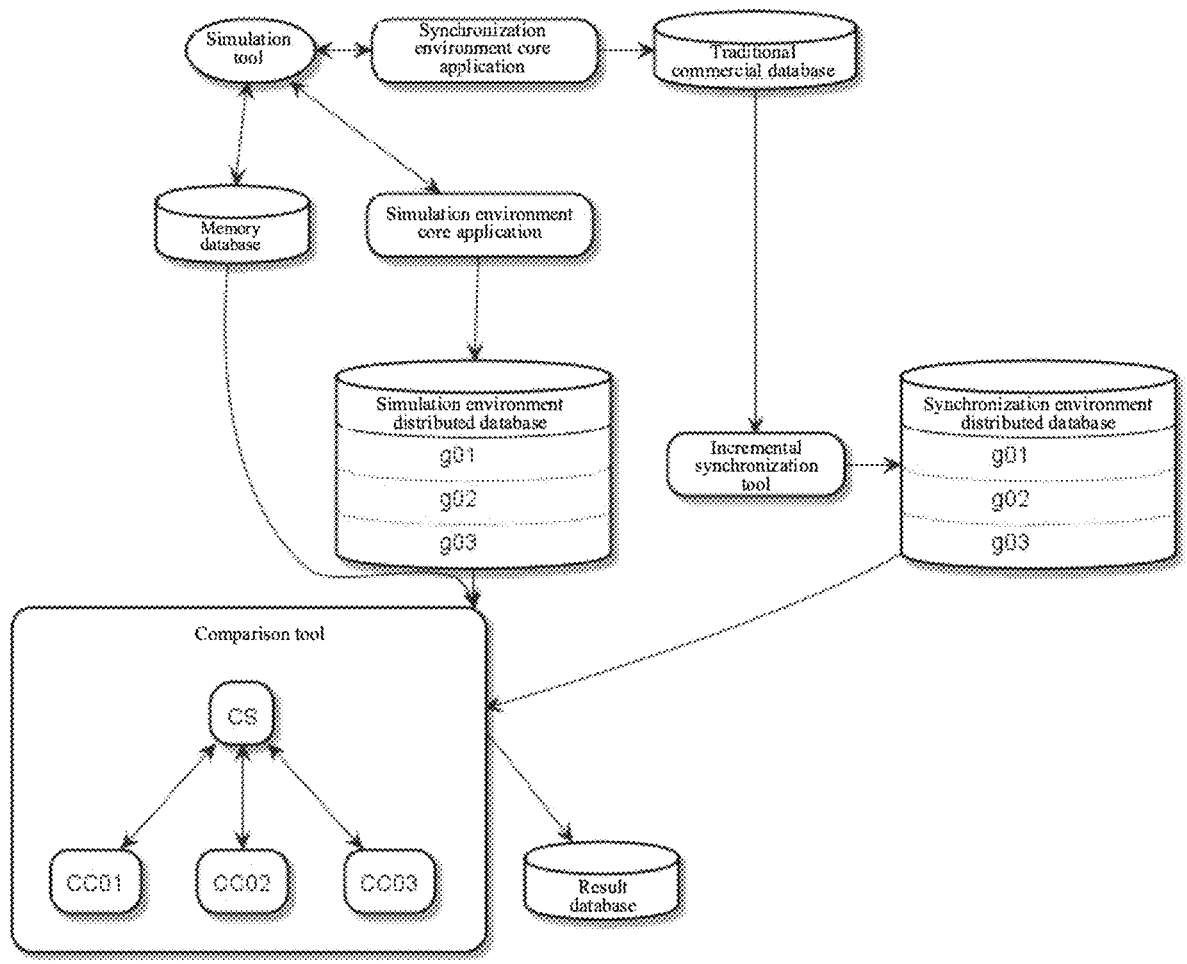
FIG. 3 is a schematic structural diagram of a system for implementing an incremental data comparison according to another embodiment of the present disclosure.

FIG. 3 is a schematic structural diagram of a system for implementing an incremental data comparison according to another embodiment of the present disclosure. As shown in FIG. 3, the system includes:

1. A synchronization environment (hereinafter "T environment") and a simulation environment (hereinafter "F environment");

In an embodiment, the T environment includes a synchronization environment core application, a traditional commercial database, an incremental synchronization tool and a synchronization environment distributed database. The synchronization environment core application is responsible for writing a service data into the traditional commercial database and generating a redo log. The incremental synchronization tool is responsible for collecting the redo log of the traditional commercial database, parsing the redo log into a plurality of SQL statements, and writing the plurality of SQL statements into the synchronization environment distributed database, and generating a binlog.

In an embodiment, the F environment includes a simulation environment core application and a simulation environment distributed database. A simulation environment core application cluster is responsible for writing a service data into a distributed database to generate a binlog.

In an embodiment, the T environment and the F environment may be pre-configured.

2. A simulation tool;

In an embodiment, the simulation tool is mainly configured to play back a T environment service and an F environment service.

3. A memory database;

In an embodiment, the memory database is mainly configured to store a mapping relationship between message values of the T environment and the F environment. For example, data obtained by some services running in two sets of environments are different. For example, a serial number of a service is 100 in the T environment and 300 in the F environment. At this time, it is required to write a mapping relationship of 100-300 into the memory database, so that when comparing data, the system may recognize an equivalent relationship between 100 and 300, and correctly determine that although the serial numbers are inconsistent, the two services are the same.

4. A comparison tool;

In an embodiment, the comparison tool includes a comparison client (CC) and a comparison server (CS). The CC may have multiple instances. Each of the instances connects a pair of shardings in the T/F environment, and sends a data analysis of the shardings to the CS. The CS has only one instance, which manages all the CCs, summarizes the data sent by the CCs and writes the data into a file, and is also responsible for comparing data in the T/F environment.

Specifically, the CCs may use a "distributed deployment", and bind one-to-one with the shardings of the distributed databases of the T environment and the F environment respectively, and carry out a "centralized management" on the CS, thus forming a "server-client" relationship with the CCs. The CS and all the CCS constitute the comparison tool. A comparison interval, database sharding information, and other contents are configured in a CS configuration file. The CS reads the configuration file and issues the configuration information to all the CCs. The CCs respond to the message, find a data consistency point according to the configuration content and feed the data consistency point back to the CS. The CS obtains a globally consistent point and issues the globally consistent point to all the CCs, and the CCs obtain data in the interval from the consistency point. The CS summarizes the data from the CCs and generates a file, and finally compares the data and outputs differentiated data.

5. A result database.

In an embodiment, the result database is mainly configured to store comparison result data.

Figure 4:
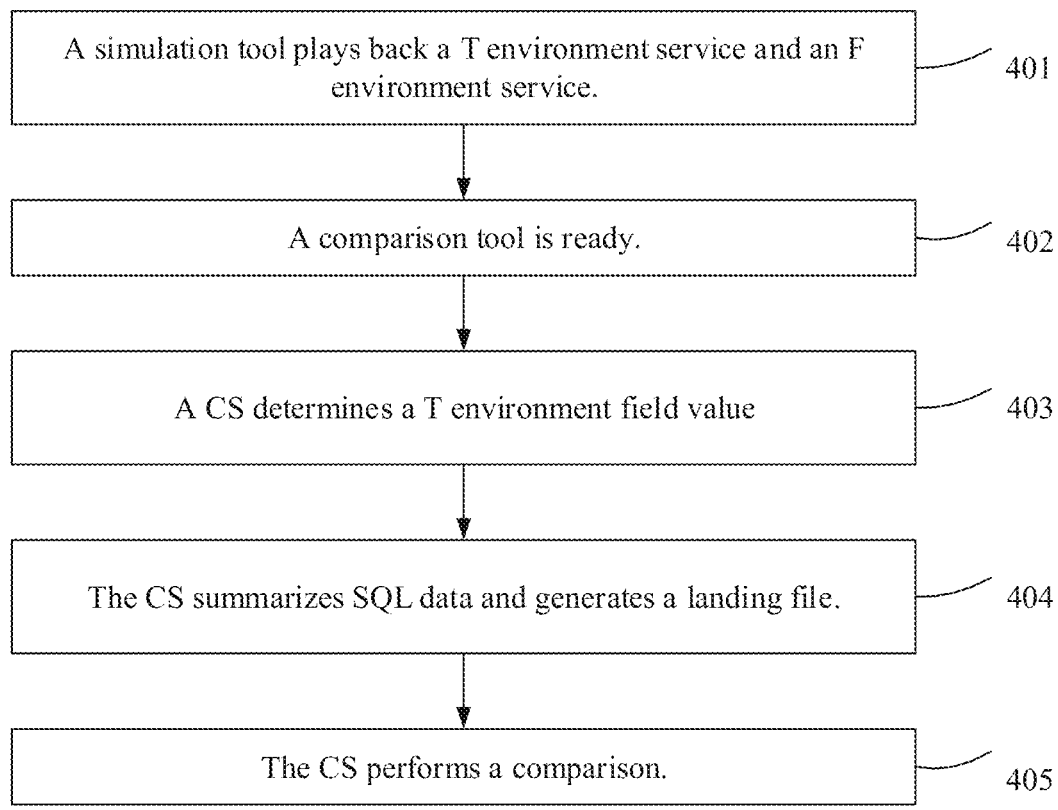
FIG. 4 is a schematic flow chart of a method for implementing an incremental data comparison according to another embodiment of the present disclosure.

FIG. 4 is a schematic flow chart of a method for implementing an incremental data comparison according to another embodiment of the present disclosure. The method for implementing the incremental data comparison provided in this embodiment may be applied to the system shown in FIG. 3.

As shown in FIG. 4, the method includes the following steps.

In step 401, a simulation tool plays back a T environment service and an F environment service.

Specifically, a simulation environment core application cluster writes a distributed database to generate a binlog. A synchronization environment core application writes a traditional commercial database to generate a redo log. An incremental synchronization tool of a synchronization environment collects the redo log in the traditional commercial database, parses the redo log into a plurality of SQL statements, and then writes the plurality of SQL statements into a synchronization environment distributed database to generate the binlog. The simulation tool parses messages returned by the synchronization environment and the simulation environment, obtains a mapping relationship between the message values, and then writes the mapping relationship between the message values into a memory database. At this point, the T environment and the F environment are deployed.

In step 402, a comparison tool is ready.

Specifically, each CC actively initiates a heartbeat registration to a CS. The CS assigns a pair of comparison sources (that is, a shading for the T environment and a sharding for the F environment) to a respective CC, and at the same time issues information such as a binlog starting position. The CC accesses the comparison sources in a simulated standby mode. In an embodiment, information of an initial state such as the binlog starting position may be obtained by the CS reading a configuration file such as compareserver.ini.

In step 403, the CS determines a T environment field value corresponding to a maximum field value.

Specifically, the CS requests a field value globally incremented in service from the CC. The CC starts from a configured initial binlog position of the F environment until a first binlog position not less than a configured field initial value is found, and returns a field value corresponding to the first binlog position to the CS. The CS counts the maximum field value and searches the T environment field value corresponding to the maximum field value through the memory database.

In step 404, the CS summarizes SQL data and generates a generation file.

Specifically, the CS notifies all the CCs to obtain binlog files and positions corresponding to the field values of the T environment and the F environment and return them to the CS. After receiving a response, the CS notifies the CCs to start parsing the binlog by batch (data of a complete interval is data of a batch). After all the CCs complete the parsing, the CS summarizes the SQL data and generates the generation file. In an embodiment, first of all, the binlog is a binary format file generated in accordance with an agreed protocol, which is used to record SQL statement information updated by a user to the database. For example, a SQL statement of changing a database table and changing a content may be recorded in the binlog, but a query of the database table and other content may not be recorded. Parsing the binlog refers to converting content in a binary format of the binlog file into a required SQL statement according to the protocol.

In step 405, the CS performs a comparison.

Specifically, the CS obtains the generation file, uses a hash algorithm to compare and record a change history with a "table name+primary key" as a key, and finally outputs differentiated data to a designated database. During the comparison, hot spot data is required to be filtered out, and a matching principle of no crossing and maximum matching (i.e., minimum difference) is required to be observed. A forward or backward matching may be used as a matching method, with the forward matching retaining a difference as much as possible and the backward matching confirming the difference as soon as possible. A record that still does not confirm a matching or confirm the difference beyond a specified number of batches (recorded as an expiration period) is recorded as an expired record, and the expired record is output as the difference. A record that fails to match before the expiration period is retained and a comparison of this record is performed in a next batch (if updated).

The technical solutions provided by the embodiments of the present disclosure can handle the comparison and verification of a large amount of data in the distributed database, differentiate the processing of different data, and consider the accuracy and efficiency of the comparison, thus ensuring the accuracy and reliability of the data in the distributed database.

Figure 5:
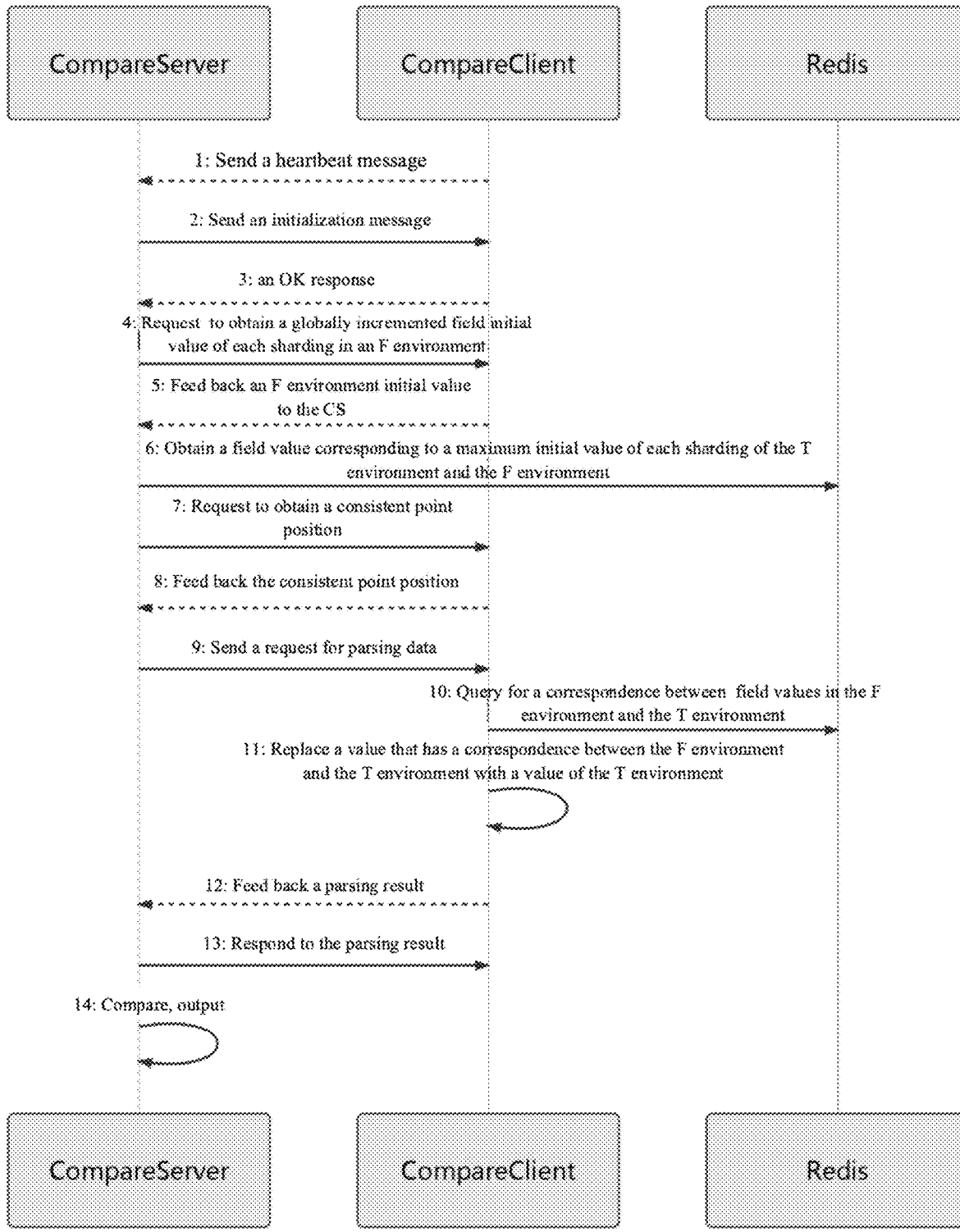
FIG. 5 is a schematic flow chart of a method for implementing an incremental data comparison according to a further embodiment of the present disclosure.

FIG. 5 is a schematic flow chart of a method for implementing an incremental data comparison according to a further embodiment of the present disclosure. In this embodiment, an incremental data comparison process of replacing a traditional commercial database e.g. a distributed database (assuming there are three shardings) with a MySQL distributed database is taken as an example. This embodiment is applied to the system shown in FIG. 3. Service data is synchronously written into the traditional commercial database and a simulation distributed database through a simulation tool. An incremental synchronization tool of a synchronization environment collects a redo log in the traditional commercial database, parses the redo log into a plurality of SQL statements, and then writes the plurality of SQL statements into a synchronization environment distributed database.

As shown in FIG. 5, the method includes the following steps.

In step 1, a CC sends a heartbeat message to a CS.

Specifically, by sending the heartbeat message, a CC01, a CC02 and a CC03 initiate a heartbeat registration to the CS.

In step 2, the CS sends an initialization message to the CC.

Specifically, the CS assigns a pair of comparison sources to each CC, and at the same time issues information such as a binlog starting position.

In step 3, the CC returns an OK response to the CS.

Specifically, the CC accesses the comparison sources in a simulated standby mode according to the initialization message. For example, the CC01 connects g01 in the synchronization environment distributed database and in a simulation environment distributed database; the CC02 connects g02; and the CC03 connects g03.

In step 4, the CS requests the CC to obtain a globally incremented field initial value of each sharding in an F environment.

In step 5, the CC returns an F environment initial value to the CS.

Specifically, the CC01, the CC02, and the CC03 search for the field initial value in the F environment and return the field initial value to the CS.

In step 6, the CS obtains a field value corresponding to a maximum initial value of each sharding of the T environment and the F environment from a memory database.

Specifically, the CS collects all the field values of the F environment, takes a maximum field value as the initial field value, queries the memory database to obtain a corresponding initial field value of the T environment, and then issues the initial field values of the F environment and the T environment to all the CCs.

In step 7, the CS requests the CC to obtain a globally consistent point position.

In step 8, the CC feeds back the globally consistent point position to the CS.

In an embodiment, the globally consistent point position refers to a globally consistent binlog position in each sharding. For example, there are two CCs each connected to a sharding of the T environment and a sharding of the F environment, which are denoted as T_g1, F_g1, T_g2 and F_g2. A correspondence relationship between starting positions of each sharding of the F environment found by a configuration file (e.g. compareserver.ini) is F_g1-3 and F_g2-14. Then a maximum value of 14 is taken as a "globally consistent point position" of the F environment, and a mapping value of the 14 is taken as a "globally consistent point position" of the T environment. There may be a plurality of CCs, and each of the plurality of CCs is connected with a sharding of the T environment and a sharding of the F environment. With this "globally consistent point position", data obtained by each of the plurality of CCs parsing the binlog may be data from or after the "globally consistent point position", thus ensuring that all data from this "globally consistent point position" may be obtained, and ensuring the consistency and integrity of the data. A starting point of each of the plurality of CCs parsing the binlog is either this "globally consistent point position" or a certain position after this "globally consistent point position".

In step 9, the CS sends a request for parsing data to the CC.

A first step for the CC to parse the data is that the CC that does not hold the maximum field value continues to search the log forward until a first record greater than or equal to the initial field value appears as a starting point for parsing the data.

In step 10, the CC queries the memory database for a correspondence between the field values in the F environment and the T environment.

In step 11, the CC replaces a value that has a correspondence between the F environment and the T environment with a value of the T environment.

In an embodiment, replacing with the field value of the T environment is to enable data that should be matched in the two environments to be matched.

In step 12, the CC feeds back a parsing result to the CS.

Specifically, for example, the CC01, the CC02 and the CC03 collect the binlog according to an interval rule, and send a collection result with an interval as a batch.

In step 13, the CS responds to the CC with the parsing result.

In step 14, the CS performs a comparison and outputs a comparison result.

Specifically, after receiving the collection results of a batch, the CS generates a generation file and performs the comparison. The comparison result is stored in the database.

In an embodiment, an algorithm for the comparison is an existing hash algorithm. A SQL statement is hashed into a bucket with a "table name+primary key" as a key. Here, SQL statements in two buckets of the T/F environment are compared. A hash bucket of the T environment is denoted as a bucket A, and a hash bucket of the F environment is denoted as a bucket B. When comparing data in the buckets A and B, it is obvious that it is impossible to compare whether the data are consistent one by one. For example, a first insert statement in the bucket A is ranked in the third of all statements in the bucket A, and a first insert statement in the bucket B (which matches the first insert statement in the bucket A) is ranked in the sixth of all statements in the bucket B. If the statements are compared one by one, the two insert statements should not be a difference, but they are output as the difference. Therefore, comparing the data in the two buckets requires an "alignment point", that is, a "difference confirmation point". At this time, whether this data is "difference data" may be confirmed. Due to the uniqueness of an insert/delete operation, an insert/delete statement is suitable as the "alignment point". First insert/delete statements of the two buckets are found, and it is compared that whether this set of insert/delete statements are consistent according to a primary key. If they are inconsistent, this set of statements is output as the difference. If they are consistent, there is no output. It can only be an update statement before the first insert/delete statement of the two buckets. If it is unilateral data, that is, only one of the buckets A and B has data before the first insert/delete statement, the first insert/delete statements are directly output as a difference. If it is not the unilateral data, but the primary keys of the first insert/delete statements are different, the first insert/delete statements may also be directly output as a difference. If the primary keys are the same, then whether there is a difference may be specifically confirmed. The two insert/delete statements may be specifically confirmed whether there is a difference. SQL statements after a last insert/delete statement are all put into the next batch to be compared. During the comparison, matching records are tried to be maximized and difference records are minimized.

In addition, this embodiment may also support comparison scenarios such as a backtracking comparison and a delay comparison. The backtracking comparison means that a certain time point in the past may be gone back and service data may be replayed for comparison. The delay comparison means that sometimes a service needs to lag behind the generation of a binlog log record for comparison.

The technical solution provided by this embodiment can accurately find the globally consistent point position (also known as "synchronization point") of the distributed database comparison, make the comparison by using the characteristics of consistent data volume in the same interval, parsing of the binlog is separated from a data comparison. The hash algorithm is selected for the comparison, which means that SQL statements of the same key are compared together. During the comparison, the uniqueness of the insert/delete operation on the primary key is utilized, and the insert/delete record is taken as the difference confirmation point, and a forward or backward matching may be performed according to service requirements, so as to maximize the matching records. The difference confirmation point is a starting point of a set of SQL statement comparisons. The defects and limitations of current data comparison methods may be effectively solved, thus ensuring a normal online operation of a new distributed database system.

The technical solutions provided by the embodiments of the present disclosure mainly include the following beneficial effects.

1. An online service data comparison of a large amount of data may be processed with the distributed database as an object, and a guarantee for a switching and launching of the new distributed database is provided.

2. The problem of the data synchronization point is solved by taking a table where the globally incremented field value is located as a heartbeat table. A CS management node is introduced to coordinate and unify the processing, and the data comparison is carried out by using the characteristics of consistent data volume in the same interval. The comparison can still be performed normally when adding data. The parsing of the binlog is separated from the data comparison, and each module has independent functions.

3. The comparison can be backtracked, that is, go back to a certain time in the past and replay the data for comparison.

4. The delay comparison is allowed, that is, lagging behind the occurrence of the log records for a certain time, such as 5 minutes. A Network Time protocol (NTP) is not required for each relevant system. A CC cycle and a database server host of the comparisons check a time difference, and determine whether to delay the collection according to a local time of the CC, a time stamp in a binlog event, and the checked time difference. The delay is configurable.

Those having ordinary skill in the art shall understand that all or some of the steps in the method disclosed above and the functions/units in the system and the apparatus can be implemented as software, firmware, hardware and an appropriate combination thereof. In the hardware implementation, division between functions/units mentioned in the above description does not necessarily correspond to division of physical components. For example, one physical component may have multiple functions, or one function or step may be implemented by several physical components. Some components or all components may be implemented as software executed by a processor, such as a central processing unit, a digital signal processor, or a microprocessor, or may be implemented as hardware, or may be implemented as an integrated circuit, for example, an application specific integrated circuit. Such software can be distributed on a computer-readable medium, which can include a computer storage medium (or non-transitory medium) and a communication medium (or transitory medium). As well known to those having ordinary skill in the art, the term computer storage medium includes a volatile or non-volatile, removable or irremovable medium implemented in any method or technology applied to storage information (such as a computer-readable instruction, a data structure, a program or other data). The computer storage medium includes, but is not limited to, a random access memory (RAM), a read-only memory (ROM), an electrically erasable programmable read only memory (EEPROM), a flash memory or other memory technology, a compact disc read-only memory (CD-ROM), a digital versatile disc (DVD) or another optical disc memory, a magnetic box, a magnetic tape, a magnetic disc or another magnetic storage apparatus, or any other medium applicable to storing desired information and accessible by a computer. In addition, as is well known to those having ordinary skill in the art, the communication medium usually includes computer-readable instructions, data structures, programs, or other data in a modulated data signal such as a carrier wave or other transmission mechanisms, and may include any information delivery medium.

What is claimed is:

1. A system for implementing an incremental data comparison, comprising:
    a real T environment, a simulation F environment, a simulation tool, a memory database, a comparison tool, and a result database; wherein:
        the real T environment includes a real environment core application, a traditional commercial database, an incremental synchronization tool and a real environment distributed database;
        the simulation F environment includes a simulation environment core application and a simulation environment distributed database;
        the simulation tool is configured to play back service data of the real environment distributed database in the real T environment and service data of the simulation environment distributed database in the simulation F environment;
        the memory database is configured to store a mapping relationship between message values of the service data in the real T environment and the service data in the simulation F environment;
        the comparison tool is configured to compare the service data in the real T environment and the service data in the simulation F environment according to the mapping relationship between the message values; and
        the result database is configured to store comparison result data generated by the comparison tool.

2. The system according to claim 1, wherein,
    the simulation environment core application is configured to write service data input by the simulation tool into the simulation environment distributed database, generate a corresponding binary log (binlog), and return a result message to the simulation tool;
    the synchronization environment core application is configured to write the service data input by the simulation tool into the traditional commercial database, generate corresponding redo log, and return a result message to the simulation tool;
    the incremental synchronization tool is configured to collect the redo log of the traditional commercial database, parse the redo log into a plurality of structured query language (SQL) statements, and then write the plurality of SQL statements into the synchronization environment distributed database to generate a corresponding binlog; and
    the simulation tool is further configured to parse result messages returned by the T environment and the F environment, obtain the mapping relationship between the message values, and then write the mapping relationship between the message values into the memory database.

3. The system according to claim 1, wherein,
the comparison tool includes a comparison server (CS) and a plurality of comparison clients (CC),
each of the plurality of CCs is configured to actively initiate a heartbeat registration to the CS,
the CS is configured to assign a pair of comparison sources to each of the plurality of CCs, and issue binlog starting position information of the T environment and the F environment to all the CCs simultaneously;
each of the plurality of CCs is further configured to access a corresponding comparison source in a simulated standby mode; and
the pair of comparison sources are respectively a sharding corresponding to the T environment and a sharding corresponding to the F environment.

4. The system according to claim 3, wherein,
the CS is further configured to request a field value globally incremented in service from each of the plurality of CCs;
each of the plurality of CCs is further configured to search from a binlog starting position in the F environment until a first binlog position not less than the field value is found, and return a field value corresponding to the first binlog position to the CS;
the CS is further configured to take a maximum field value as an initial field value after collecting the field value returned by each of the plurality of CCs, query the memory database to obtain a corresponding initial field value of the T environment corresponding to the initial field value according to the mapping relationship between the message values of the T environment and the F environment, and issue the initial field values of the T environment and the F environment to all the CCs;
each of the plurality of CCs is further configured to obtain a binlog file and position corresponding to the initial field values of the T environment and the F environment, and return the binlog file and position to the CS;
the CS, after receiving the binlog file and position, notifies all the CCs to start parsing the binlog by batch;
each of the plurality of CCs is further configured to parse the binlog by batch, replace a value that has a correspondence between the F environment and the T environment with a value of the T environment, and return a parsing result; and
the CS generates a generation file and performs a comparison after receiving a parsing result of a batch, and stores a comparison result in the result database.

5. The system according to claim 4, wherein performing the comparison includes:
comparing and recording a change history in the generation file by using a hash algorithm with a "table name+primary key" as a key;
filtering hot spot data during the comparison, observing a matching principle of no crossing and maximum matching, and using a forward or backward matching as a matching method, wherein the forward matching retains a difference and the backward matching confirms the difference; and
recording a record that still does not confirm a matching or confirm the difference beyond a specified number of batches as an expired record, outputting the expired record as the difference, retaining a record that fails to match before an expiration period to perform a comparison in a next batch.

6. A method for implementing an incremental data comparison, comprising:
a real T environment includes a real environment core application, a traditional commercial database, an incremental synchronization tool and a real environment distributed database;
a simulation F environment includes a simulation environment core application and a simulation environment distributed database;
playing back, by a simulation tool, service data of the real environment distributed database in the real T environment and service data of the simulation environment distributed database in the simulation F environment;
storing a mapping relationship between message values of the service data in the real T environment and the service data in the simulation F environment in a memory database; and
comparing, by a comparison tool, the service data in the real T environment and the service data in the simulation F environment according to the mapping relationship between the message values and storing comparison result data in a result database.

7. The method according to claim 6, wherein,
the T environment includes a synchronization environment core application, a traditional commercial database, an incremental synchronization tool and a synchronization environment distributed database; and the F environment includes a simulation environment core application and a simulation environment distributed database;
the step of the simulation tool playing back the T environment service and the F environment service includes:
writing, by the simulation environment core application, service data input by the simulation tool into the simulation environment distributed database in the F environment, generating a corresponding binary log (binlog), and returning a result message to the simulation tool;
writing, by the synchronization environment core application, the service data input by the simulation tool into the traditional commercial database, generating a corresponding redo log, and returning a result message to the simulation tool;
collecting, by the incremental synchronization tool, the redo log of the traditional commercial database, parsing the redo log into a plurality of structured query language (SQL) statements, and then writing the plurality of SQL statements into the synchronization environment distributed database to generate a corresponding binlog; and
parsing, by the simulation tool, result messages returned by the T environment and the F environment, obtaining the mapping relationship between the message values, and then writing the mapping relationship between the message values into the memory database.

8. The method according to claim 6, wherein,
the comparison tool includes a comparison server (CS) and a plurality of comparison clients (CC);
before the comparison tool compares the data in the T environment and the F environment, the method further comprises:
initiating, by each of the plurality of CCs, a heartbeat registration to the CS actively, assigning, by the CS, a pair of comparison sources to each of the plurality of CCs, and issuing binlog starting position information of the T environment and the F T environment to all the CCs simultaneously; and accessing, by each of the plurality of CCs, a corresponding comparison source in a simulated standby mode;

wherein the pair of comparison sources are respectively a sharding corresponding to the T environment and a sharding corresponding to the F environment.

9. The method according to claim 8, wherein the step of the comparison tool comparing the data in the T environment and the F environment according to the mapping relationship between the message values comprises:

requesting, by the CS, a field value globally incremented in service from each of the plurality of CCs;

searching, by each of the plurality of CCs, from a binlog starting position in the F environment until a first binlog position not less than the field value is found, and returning a field value corresponding to the position to the CS;

taking, by the CS, a maximum field value as an initial field value after collecting the field value returned by each of the plurality of CCs, querying the memory database to obtain a corresponding initial field value of the T environment corresponding to the initial field value according to the mapping relationship between the message values of the T environment and the F environment, and issuing the initial field value to all the CCs;

obtaining, by each of the plurality of CCs, a binlog file and position corresponding to the initial field values in the T environment and the F environment, and returning the binlog file and position to the CS;

notifying, by the CS, all the CCs to start parsing the binlog by batch after receiving the binlog file and position;

parsing, by each of the plurality of CCs, the binlog by batch, replacing a value that has a correspondence between the F environment and the T environment with a value of the T environment, and returning a parsing result; and generating, by the CS, a generation file and performing a comparison after receiving a parsing result of a batch, and storing a comparison result in the result database.

10. The method according to claim 9, wherein performing the comparison includes:

comparing and recording a difference in the generation file by using a hash algorithm with a "table name+ primary key" as a key;

filtering hot spot data during the comparison, observing a matching principle of no crossing and maximum matching, and using a forward or backward matching as a matching method, wherein the forward matching retains a difference and the backward matching confirms the difference; and recording a record that still does not confirm a matching or confirm the difference beyond a specified number of batches as an expired record, outputting the expired record as the difference, retaining a record that fails to match before an expiration period to perform a comparison in a next batch.

* * * * *